US012658580B2

(12) United States Patent
Tao et al.

(10) Patent No.: US 12,658,580 B2
(45) Date of Patent: Jun. 16, 2026

(54) ELECTRONIC DEVICE WITH ANTENNA GROUNDING THROUGH SENSOR MODULE

(71) Applicant: Apple Inc., Cupertino, CA (US)

(72) Inventors: Yuan Tao, Santa Clara, CA (US); Yiren Wang, Cupertino, CA (US); Ana Papio Toda, San Jose, CA (US); Jingni Zhong, Santa Clara, CA (US); Han Wang, Campbell, CA (US); Hao Xu, Cupertino, CA (US); Hongfei Hu, Cupertino, CA (US); Mattia Pascolini, San Francisco, CA (US); Eric W Bates, San Jose, CA (US); Peter A Dvorak, Menlo Park, CA (US); Allegra Shum, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 18/458,779

(22) Filed: Aug. 30, 2023

(65) Prior Publication Data

US 2024/0079779 A1 Mar. 7, 2024

Related U.S. Application Data

(60) Provisional application No. 63/403,993, filed on Sep. 6, 2022.

(51) Int. Cl.
*H01Q 5/00* (2015.01)
*H01Q 5/328* (2015.01)
*H01Q 9/04* (2006.01)

(52) U.S. Cl.
CPC ........... *H01Q 5/328* (2015.01); *H01Q 9/0442* (2013.01)

(58) Field of Classification Search
CPC ........ H01Q 5/328; H01Q 9/0442; H01Q 9/42; H01Q 1/243; H01Q 1/22; H01Q 1/44; H01Q 1/48
See application file for complete search history.

(56) References Cited

U.S. PATENT DOCUMENTS

| | | | |
|---|---|---|---|
| 5,215,477 | A | 6/1993 | Weber et al. |
| 8,313,207 | B2 | 11/2012 | Kuromizu |
| 9,131,037 | B2 | 9/2015 | Corbin et al. |
| 9,590,290 | B2 | 3/2017 | Martiskainen et al. |
| 10,707,561 | B2 | 7/2020 | Hobson et al. |
| 10,862,216 | B1 | 12/2020 | Ayala Vazquez et al. |
| 10,868,356 | B1 | 12/2020 | Da Costa Bras Lima et al. |

(Continued)

*Primary Examiner* — Ping Y Hsieh
(74) *Attorney, Agent, or Firm* — Treyz Law Group, P.C.; Michael H. Lyons

(57) ABSTRACT

An electronic device may be provided with a sensor module and an antenna having an antenna arm, ground structures, and a tuner. The tuner may be mounted to a printed circuit overlapping the sensor module. A spring may be mounted to the printed circuit and may couple the tuner to a conductive chassis of the sensor module. The sensor module may include optical sensors that gather sensor data through a display and may form ground paths from the tuner to the ground structures. Conductive interconnect structures such as springs may exert biasing forces in different directions to couple the ground paths to different layers of the ground structures. This may serve to couple the antenna to the ground structures as close as possible to the tuner, thereby maximizing antenna performance, despite the presence of the sensor module.

20 Claims, 7 Drawing Sheets

(56) References Cited

U.S. PATENT DOCUMENTS

| | | | |
|---|---|---|---|
| 2012/0162040 A1 | 6/2012 | Taura et al. | |
| 2019/0260112 A1* | 8/2019 | Azad | H01Q 9/42 |
| 2019/0393586 A1* | 12/2019 | Ayala Vazquez | H01Q 5/328 |
| 2022/0263243 A1 | 8/2022 | Sakurai | |
| 2023/0046166 A1* | 2/2023 | Hwang | H04M 1/026 |

* cited by examiner

ELECTRONIC DEVICE WITH ANTENNA GROUNDING THROUGH SENSOR MODULE

This application claims the benefit of U.S. Provisional Patent Application No. 63/403,993, filed Sep. 6, 2022, which is hereby incorporated by reference herein in its entirety.

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for electronic devices to also include sensors that gather sensor data for performing various device functions.

It can be challenging to provide small form factor electronic devices with antennas that still exhibit satisfactory wireless performance despite the presence of nearby components such as sensors.

SUMMARY

An electronic device may be provided with wireless circuitry and a housing having peripheral conductive housing structures. A display may be mounted to the housing. A segment of the peripheral conductive housing structures may be separated from ground structures by a slot. The segment may form an antenna resonating element for an antenna. The ground structures may include a conductive support plate in a rear housing wall for the device, a mid-chassis for the device, and a display module in the display.

A sensor module may at least partially overlap the slot. A flexible printed circuit may at least partially overlap the sensor module. A tuner may be mounted to the flexible printed circuit. The tuner may be coupled to the segment. A conductive spring may be mounted to the flexible printed circuit. The sensor module may form one or more ground paths from the tuner to the ground structures. The conductive spring may couple the tuner to a conductive structure in the sensor module. The conductive structure may include a conductive chassis (frame) for the sensor module. The sensor module may include a set of optical sensors mounted to the conductive chassis that gather sensor data through the display.

The sensor module may form at least first, second, third, and fourth ground paths from the conductive spring to the ground structures. For example, the first ground path may be coupled to the display module through a first conductive interconnect structure such as conductive foam. The second ground path may be coupled to the mid-chassis through a second conductive interconnect structure such as a conductive spring. The third and fourth ground paths may be coupled to the conductive support plate through third and fourth conductive interconnect structures such as conductive springs. The conductive spring on the flexible printed circuit, the third conductive interconnect structure, and the fourth conductive interconnect structure may exert biasing forces in a first direction. The first and second conductive interconnect structures may exert biasing forces in a second direction opposite the first direction. In this way, the antenna may be coupled to the ground structures as close as possible to the tuner, thereby maximizing antenna performance, despite the presence of the sensor module.

DETAILED DESCRIPTION

Figure 1:
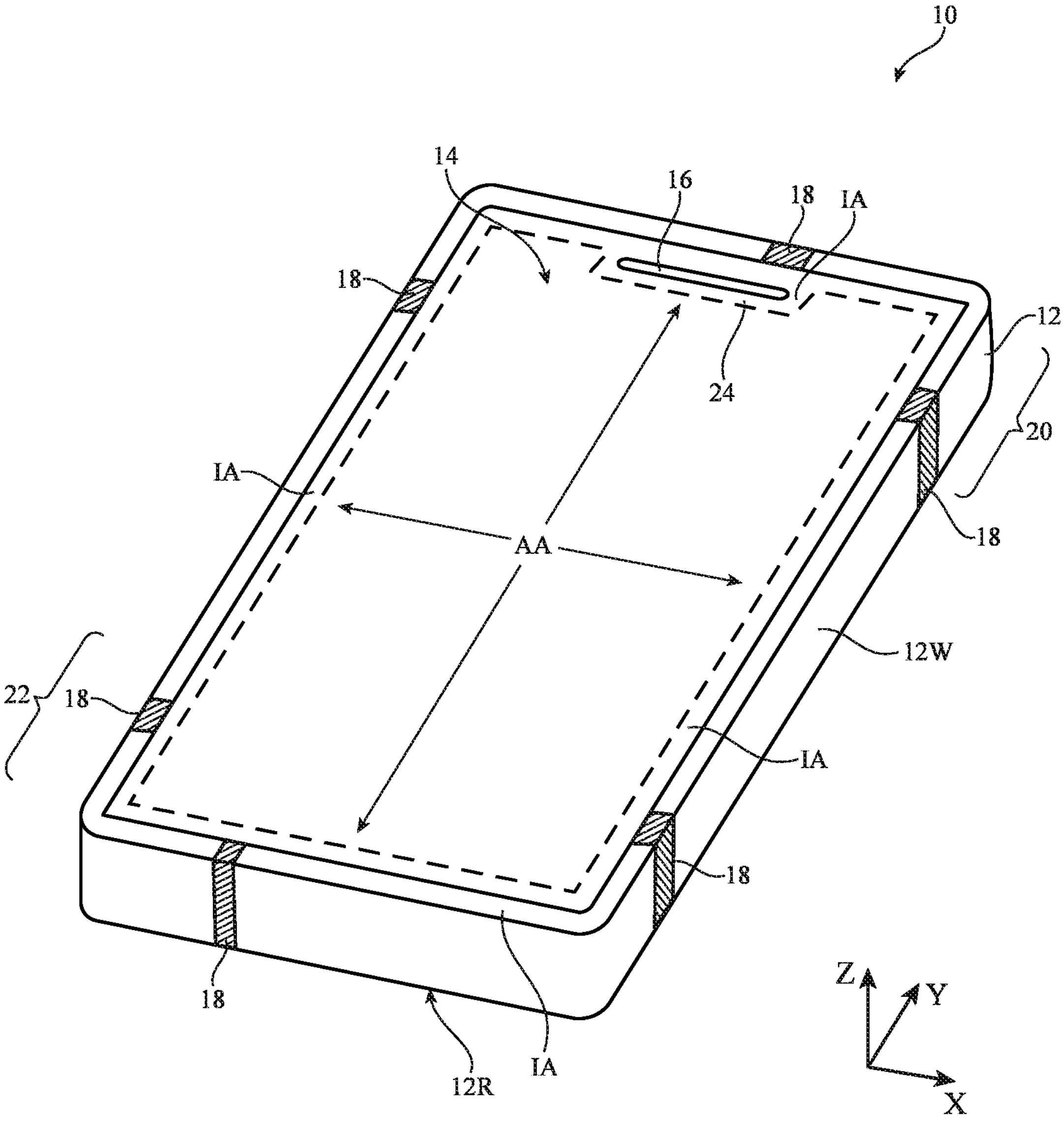
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed from a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W. One or more sensors may be aligned with notch 24 and may transmit and/or receive light through display 14 within notch 24.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
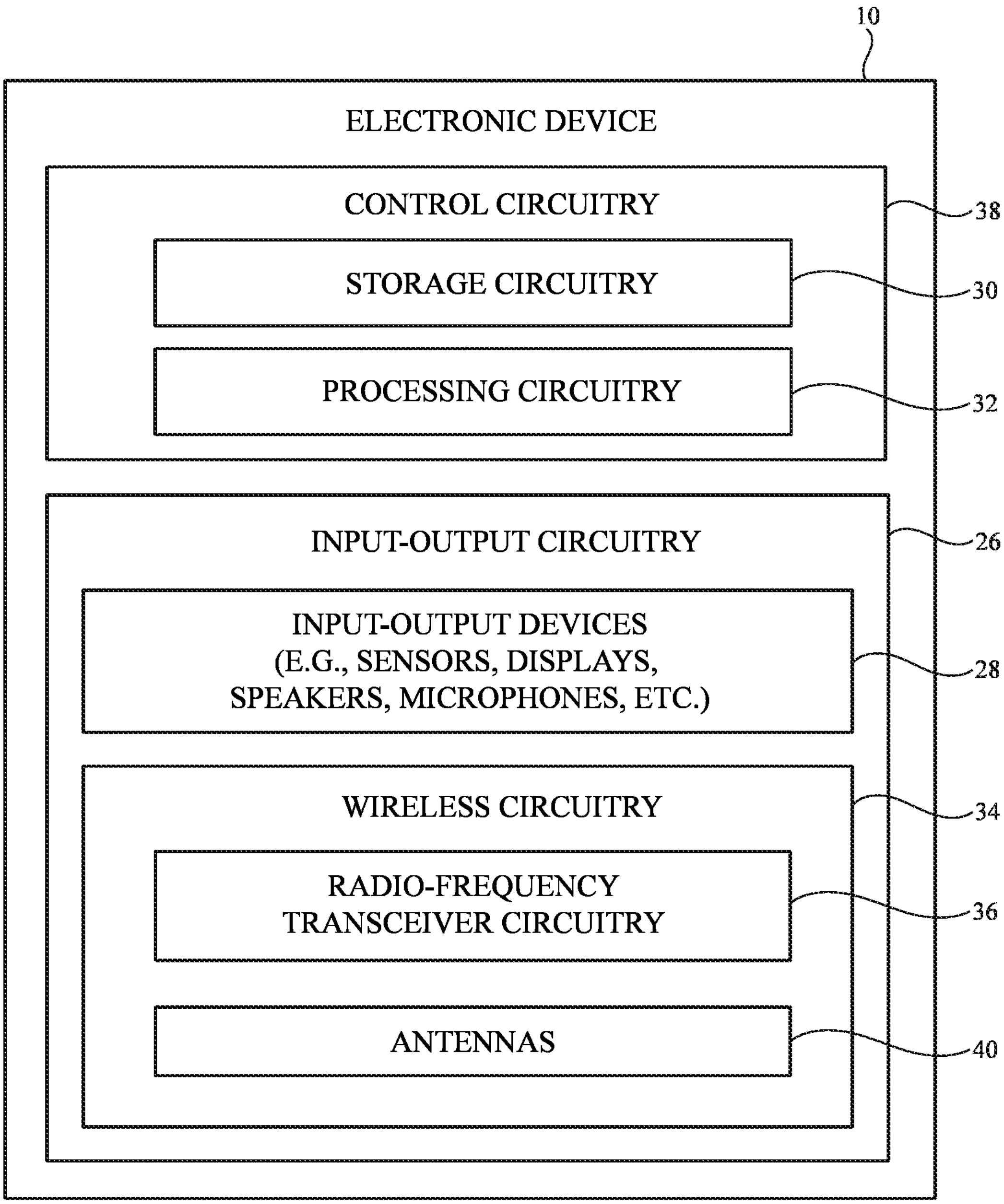
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices 28 may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components. The sensors in input-output devices 28 may include front-facing sensors that gather sensor data through display 14. The front-facing sensors may be optical sensors. The optical sensors may include an image sensor (e.g., a front-facing camera), an infrared sensor, and/or an ambient light sensor. The infrared sensor may include one or more infrared emitters (e.g., a dot projector and a flood illuminator) and/or one or more infrared image sensors.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals within corresponding frequency bands at radio frequencies (sometimes referred to herein as communications bands or simply as "bands"). The frequency bands handled by radio-frequency transceiver circuitry 36 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 34 may also be used to perform spatial ranging operations if desired.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. If desired, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time). Different types of antennas may be used for different bands and combinations of bands.

Figure 3:
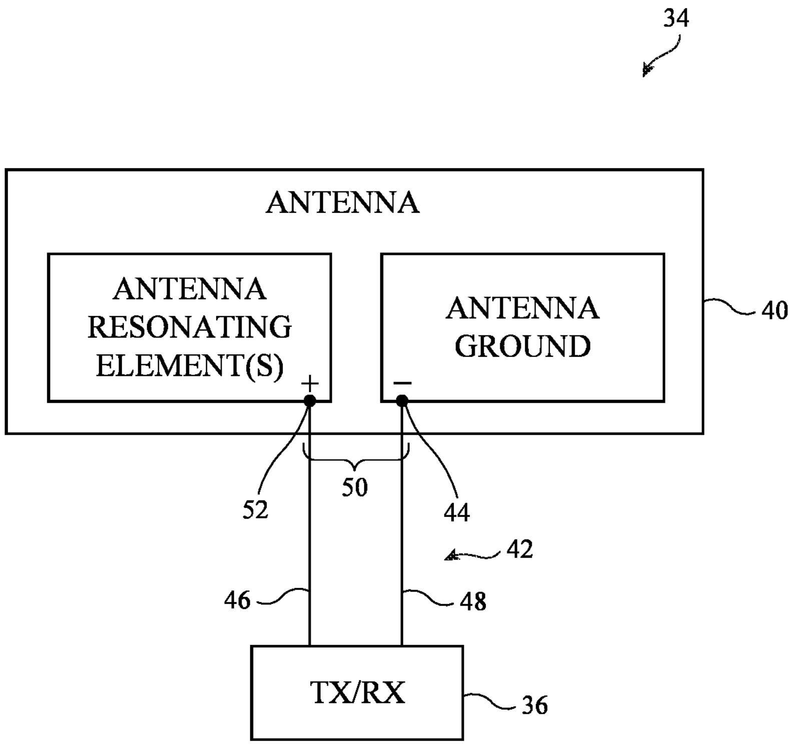
FIG. 3 is a schematic diagram of illustrative wireless circuitry in accordance with some embodiments.

FIG. 3 is a schematic diagram showing how a given antenna 40 may be fed by radio-frequency transceiver circuitry 36. As shown in FIG. 3, antenna 40 may have a corresponding antenna feed 50. Antenna 40 may include one or more antenna resonating (radiating) elements 45 and an antenna ground 49. Antenna resonating element(s) 45 may include one or more radiating arms, slots, waveguides, dielectric resonators, patches, parasitic elements, indirect feed elements, and/or any other desired antenna radiators. Antenna feed 50 may include a positive antenna feed terminal 52 coupled to antenna resonating element 45 and a ground antenna feed terminal 44 coupled to antenna ground 49.

Radio-frequency transceiver (TX/RX) circuitry 36 may be coupled to antenna feed 50 using a radio-frequency transmission line path 42 (sometimes referred to herein as transmission line path 42). Transmission line path 42 may include a signal conductor such as signal conductor 46 (e.g., a positive signal conductor). Transmission line path 42 may include a ground conductor such as ground conductor 48. Ground conductor 48 may be coupled to ground antenna feed terminal 44 of antenna feed 50. Signal conductor 46 may be coupled to positive antenna feed terminal 52 of antenna feed 50.

Transmission line path 42 may include one or more radio-frequency transmission lines. The radio-frequency transmission line(s) in transmission line path 42 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of radio-frequency transmission line may be used to form transmission line path 42. Filter circuitry, switching circuitry, impedance matching circuitry, phase shifter circuitry, amplifier circuitry, and/or other circuitry may be interposed on transmission line path 42, if desired. One or more antenna tuning components for adjusting the frequency response of antenna 40 in one or more bands may be interposed on transmission line path 42 and/or may be integrated within antenna 40 (e.g., coupled between the antenna ground and the antenna resonating element of antenna 40, coupled between different portions of the antenna resonating element of antenna 40, etc.).

If desired, one or more of the radio-frequency transmission lines in transmission line path 42 may be integrated into ceramic substrates, rigid printed circuit boards, and/or flexible printed circuits. In one suitable arrangement, the radio-frequency transmission lines may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All the multiple layers of the laminated structures may be batch laminated together (e.g., in a single pressing process) without adhesive (e.g., as opposed to performing multiple pressing processes to laminate multiple layers together with adhesive).

Figure 4:
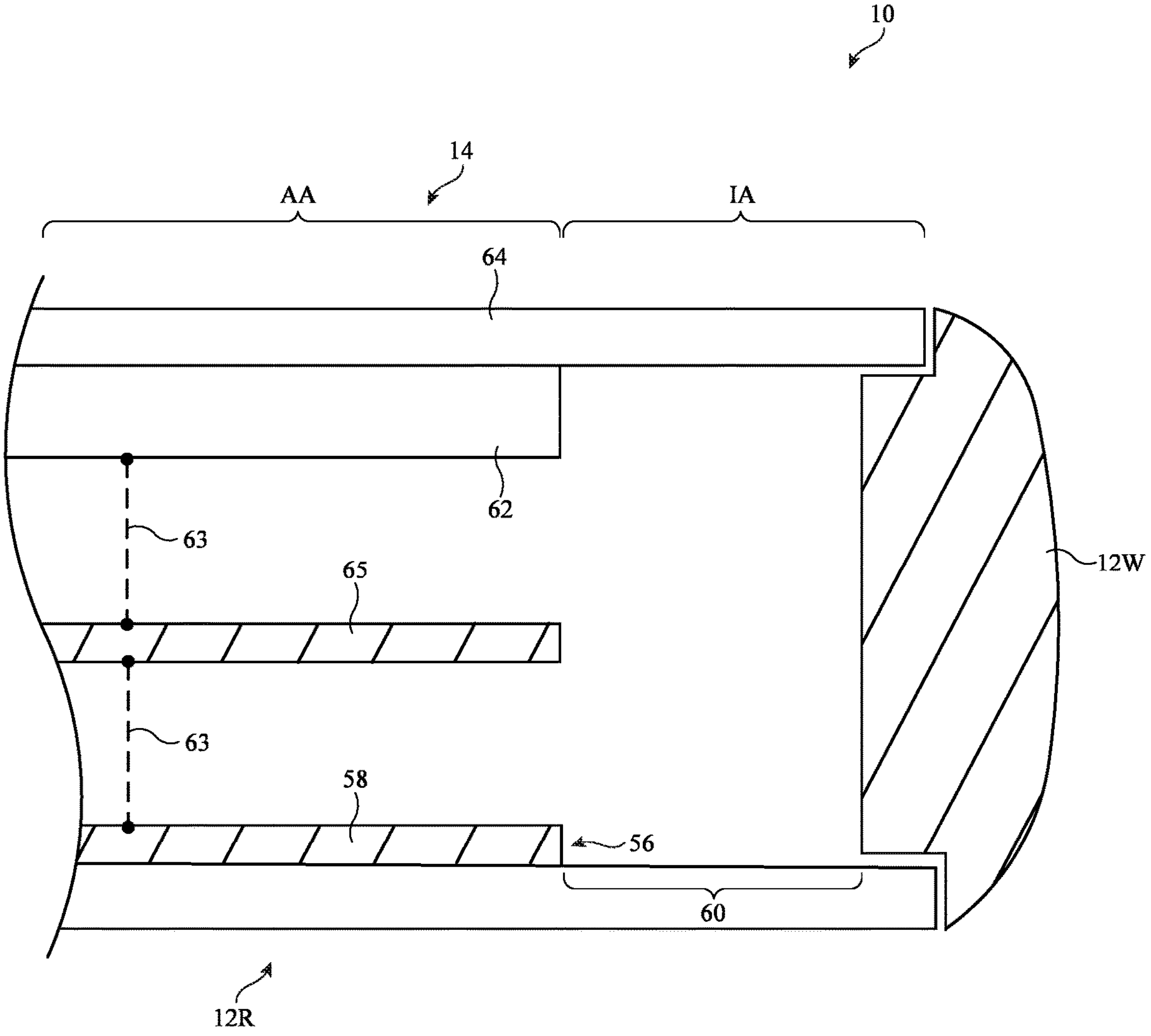
FIG. 4 is a cross-sectional side view of an electronic device having housing structures that may be used in forming antenna structures in accordance with some embodiments.

If desired, conductive electronic device structures such as conductive portions of housing 12 (FIG. 1) may be used to form at least part of one or more of the antennas 40 in device 10. FIG. 4 is a cross-sectional side view of device 10, showing illustrative conductive electronic device structures that may be used in forming one or more of the antennas 40 in device 10.

As shown in FIG. 4, peripheral conductive housing structures 12W may extend around the lateral periphery of device 10 (e.g., as measured in the X-Y plane of FIG. 1). Peripheral conductive housing structures 12W may extend from rear housing wall 12R (e.g., at the rear face of device 10) to display 14 (e.g., at the front face of device 10). In other words, peripheral conductive housing structures 12W may form conductive sidewalls for device 10, a first of which is shown in the cross-sectional side view of FIG. 4 (e.g., a given sidewall that runs along an edge of device 10 and that extends across the width or length of device 10).

Display 14 may have a display module such as display module 62 (sometimes referred to as a display panel). Display module 62 may include pixel circuitry, touch sensor circuitry, force sensor circuitry, and/or any other desired circuitry for forming active area AA of display 14. Display 14 may include a dielectric cover layer such as display cover layer 64 that overlaps display module 62. Display cover layer 64 may include plastic, glass, sapphire, ceramic, and/or any other desired dielectric materials. Display module 62 may emit image light and may receive sensor input (e.g., touch and/or force sensor input) through display cover layer 64. Display cover layer 64 and display 14 may be mounted to peripheral conductive housing structures 12W. The lateral area of display 14 that does not overlap display module 62 may form inactive area IA of display 14.

As shown in FIG. 4, rear housing wall 12R may be mounted to peripheral conductive housing structures 12W (e.g., opposite display 14). Rear housing wall 12R may include a conductive layer such as conductive support plate 58. Conductive support plate 58 may extend across an entirety of the width of device 10 (e.g., between the left and right edges of device 10 as shown in FIG. 1). Conductive support plate 58 may be formed from an integral portion of peripheral conductive housing structures 12W that extends across the width of device 10 or may include a separate housing structure attached, coupled, or affixed to peripheral conductive housing structures 12W.

If desired, rear housing wall 12R may include a dielectric cover layer such as dielectric cover layer 56. Dielectric cover layer 56 may include glass, plastic, sapphire, ceramic, one or more dielectric coatings, or other dielectric materials. Dielectric cover layer 56 may be layered under conductive support plate 58 (e.g., conductive support plate 58 may be coupled to an interior surface of dielectric cover layer 56). If desired, dielectric cover layer 56 may extend across an entirety of the width of device 10 and/or an entirety of the length of device 10. Dielectric cover layer 56 may overlap slot 60. If desired, dielectric cover layer 56 be provided with pigmentation and/or an opaque masking layer (e.g., an ink layer) that helps to hide the interior of device 10 from view. In another suitable arrangement, dielectric cover layer 56 may be omitted and slot 60 may be filled with a solid dielectric material.

The housing for device 10 may also include one or more additional conductive support plates interposed between display 14 and rear housing wall 12R. For example, the housing for device 10 may include a conductive support plate such as mid-chassis 65 (sometimes referred to herein as conductive support plate 65). Mid-chassis 65 may be vertically interposed between rear housing wall 12R and display 14 (e.g., conductive support plate 58 may be located at a first distance from display 14 whereas mid-chassis 65 is located at a second distance that is less than the first distance from display 14). Mid-chassis 65 may extend across an entirety of the width of device 10 (e.g., between the left and right edges of device 10 as shown in FIG. 1). Mid-chassis 65 may be formed from an integral portion of peripheral conductive housing structures 12W that extends across the width of device 10 or may include a separate housing structure attached, coupled, or affixed to peripheral conductive housing structures 12W. One or more components may be supported by mid-chassis 65 (e.g., logic boards such as a main logic board, a battery, etc.) and/or mid-chassis 65 may contribute to the mechanical strength of device 10. Mid-chassis 65 may be formed from metal (e.g., stainless steel, aluminum, etc.).

Conductive support plate 58, mid-chassis 65, and/or display module 62 may have an edge 54 that is separated from peripheral conductive housing structures 12W by dielectric-filled slot 60 (sometimes referred to herein as opening 60, gap 60, or aperture 60). Slot 60 may be filled with air, plastic, ceramic, or other dielectric materials. Conductive housing structures such as conductive support plate 58, mid-chassis 65, conductive portions of display module 62, and/or peripheral conductive housing structures 12W (e.g., the portion of peripheral conductive housing structures 12W opposite conductive support plate 58, mid-chassis 65, and display module 62 at slot 60) may be used to form antenna structures for one or more of the antennas 40 in device 10.

For example, peripheral conductive housing structures 12W may form an antenna resonating element arm (e.g., an inverted-F antenna resonating element arm) in the antenna resonating element 45 of an antenna 40 in device 10. Mid-chassis 65, conductive support plate 58, and/or display module 62 may be used to form the antenna ground 49 (FIG. 3) for one or more of the antennas 40 in device 10 and/or to form one or more edges of slot antenna resonating elements for the antennas in device 10. One or more conductive interconnect structures 63 may electrically couple mid-chassis 65 to conductive support plate 58 and/or one or more conductive interconnect structures 63 may electrically couple mid-chassis 65 to conductive structures in display module 62 (sometimes referred to herein as conductive display structures) so that each of these elements form part of the antenna ground. The conductive display structures may include a conductive frame, bracket, or support for display module 62, shielding layers in display module 62, ground traces in display module 62, etc.

Conductive interconnect structures 63 may serve to ground mid-chassis 65 to conductive support plate 58 and/or display module 62 (e.g., to ground conductive support plate 58 to the conductive display structures through mid-chassis 65). Put differently, conductive interconnect structures 63 may hold the conductive display structures, mid-chassis 65, and/or conductive support plate 58 to a common ground or reference potential (e.g., as a system ground for device 10 that is used to form part of antenna ground 49 of FIG. 3). Conductive interconnect structures 63 may therefore sometimes be referred to herein as grounding structures 63, grounding interconnect structures 63, or vertical grounding structures 63. Conductive interconnect structures 63 may include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures.

Figure 5:
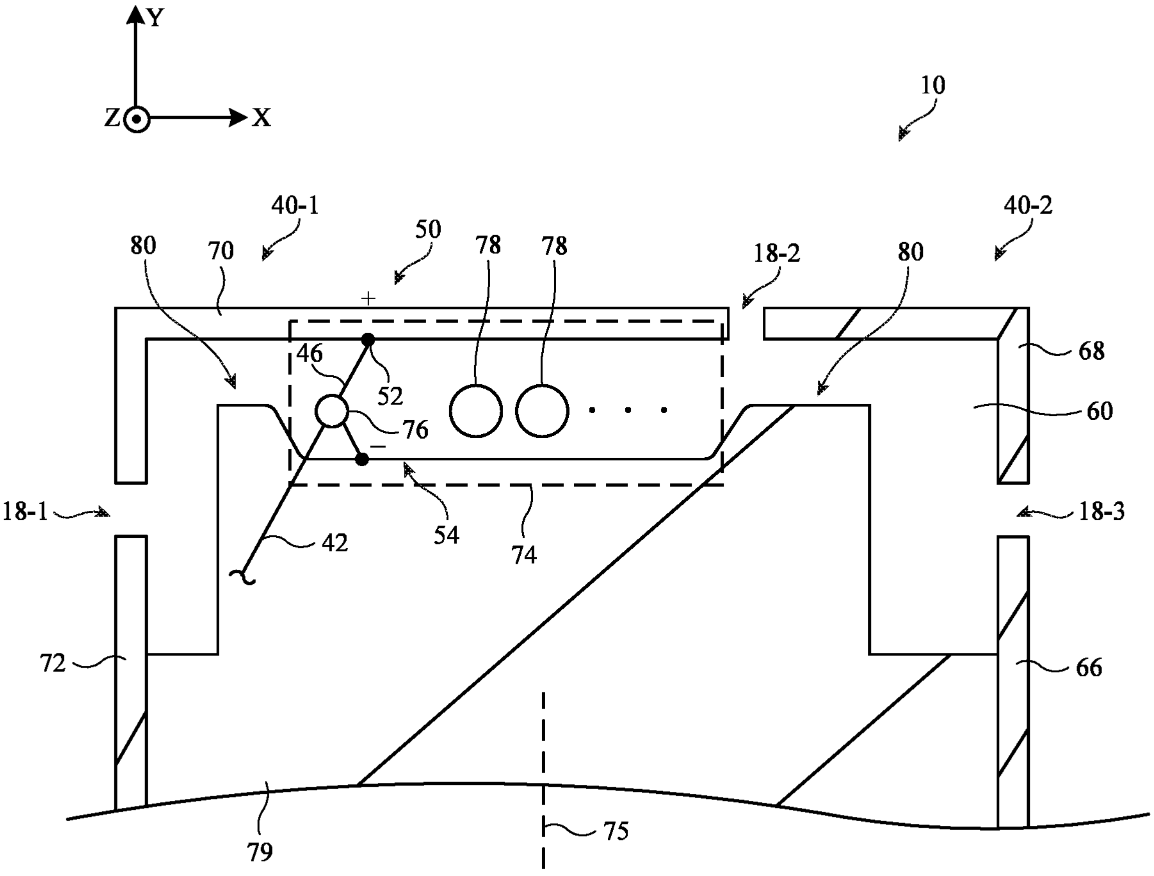
FIG. 5 is a top interior view of the upper end of an illustrative electronic device having an antenna and sensors in accordance with some embodiments.

If desired, device 10 may include multiple slots 60 and peripheral conductive housing structures 12W may include multiple dielectric gaps that divide the peripheral conductive housing structures into segments (e.g., dielectric gaps 18 of FIG. 1). FIG. 5 is a top (front) interior view showing how the upper end of device 10 (e.g., within region 20 of FIG. 1) may include a slot 60 and may include multiple dielectric gaps that divide the peripheral conductive housing structures into segments for forming multiple antennas. Display 14 and other internal components have been removed from the view shown in FIG. 5 for the sake of clarity.

As shown in FIG. 5, peripheral conductive housing structures 12W may include a first conductive sidewall at the left edge of device 10, a second conductive sidewall at the top edge of device 10, a third conductive sidewall at the right edge of device 10, and a fourth conductive sidewall at the bottom edge of device 10 (not shown in FIG. 5). Peripheral conductive housing structures 12W may be segmented by dielectric-filled gaps 18 such as a first gap 18-1, a second gap 18-2, and a third gap 18-3. Gaps 18-1, 18-2, and 18-3 may be filled with plastic, ceramic, sapphire, glass, epoxy, or other dielectric materials. The dielectric material in the gaps may lie flush with peripheral conductive housing structures 12W at the exterior surface of device 10 if desired.

Gap 18-1 may divide the first conductive sidewall to separate segment 72 of peripheral conductive housing structures 12W from segment 70 of peripheral conductive housing structures 12W. Gap 18-2 may divide the second conductive sidewall to separate segment 70 from segment 68 of peripheral conductive housing structures 12W. Gap 18-3 may divide the third conductive sidewall to separate segment 68 from segment 66 of peripheral conductive housing structures 12W. In this example, segment 70 forms the upper-left corner of device 10 (e.g., segment 68 may have a bend at the corner) and is formed from the first and second conductive sidewalls of peripheral conductive housing structures 12W (e.g., in upper region 20 of FIG. 1).

Device 10 may include ground structures 79 (e.g., structures that form part of antenna ground 49 of FIG. 3 for one or more of the antennas in device 10). Ground structures 79 may include one or more metal layers such conductive support plate 58 (FIG. 4), mid-chassis 65 (FIG. 4), conductive display structures in display module 62 (FIG. 4), conductive interconnect structures 63 (FIG. 4), conductive traces on a printed circuit board, conductive portions of one or more components in device 10, etc. Ground structures 79 may extend between opposing sidewalls of peripheral conductive housing structures 12W. For example, ground structures 79 may extend from segment 72 to segment 66 of peripheral conductive housing structures 12W (e.g., across the width of device 10, parallel to the X-axis of FIG. 5). Ground structures 79 may be welded or otherwise affixed to segments 66 and 72. In another suitable arrangement, some or all of ground structures 79, segment 66, and segment 72 may be formed from a single, integral (continuous) piece of machined metal (e.g., in a unibody configuration).

Ground structures 79 may define edge 54 of slot 60 and may be separated from peripheral conductive housing structures 12W by slot 60. Ground structures 79 may include one or more ground extensions 80 that protrude into slot 60 and towards peripheral conductive housing structures 12W. Ground extensions 80 may be formed from mid-chassis 65 of FIG. 4, for example. Device 10 may have a longitudinal axis 75 that bisects the width of device 10 and that runs parallel to the length of device 10 (e.g., parallel to the Y-axis).

As shown in FIG. 5, slot 60 may separate ground structures 79 from segments 68 and 70 of peripheral conductive housing structures 12W (e.g., the upper edge of slot 60 may be defined by segments 68 and 70 whereas the lower edge of slot 60 is defined by ground structures 79). Slot 60 may have an elongated shape extending from a first end at gap 18-1 to an opposing second end at gap 18-2 (e.g., slot 60 may span the width of device 10). Slot 60 may be filled with air, plastic, glass, sapphire, epoxy, ceramic, or other dielectric material. Slot 60 may be continuous with gaps 18-1, 18-2, and 18-3 in peripheral conductive housing structures 12W if desired (e.g., a single piece of dielectric material may be used to fill both slot 60 and gaps 18-1, 18-2, and 18-3).

Ground structures 79, segment 66, segment 68, segment 70, and portions of slot 60 may be used in forming multiple antennas 40 in the upper region of device 10 (sometimes referred to herein as lower antennas). For example, device 10 may include a first antenna 40-1 having an antenna resonating (radiating) element 45 (FIG. 4) that includes an antenna arm formed from segment 70 and having an antenna ground 49 (FIG. 4) formed from ground structures 79. Device 10 may also include a second antenna 40-2 having an antenna resonating element formed from segment 68 and having an antenna ground formed from ground structures 79.

Antenna 40-1 may be fed by a corresponding antenna feed 50 coupled across slot 60. Positive antenna feed terminal 52 of antenna feed 50 may be coupled to segment 70. Ground antenna feed terminal 44 of antenna feed 50 may be coupled to ground structures 79. Antenna 40-1 may be, for example, an inverted-F antenna having one or more return paths (not shown in FIG. 5) that couples the antenna resonating element 45 (FIG. 3) of antenna 40-1 (e.g., segment 70) to the antenna ground 49 (FIG. 3) of antenna 40-1 (e.g., ground structures 79). One or more tuning elements may be disposed on the return path(s). Antenna 40-1 may include tuning circuitry such as tuner 76 disposed on the transmission line path 42 that feeds antenna 40-1. Tuner 76 may have at least a first terminal coupled to positive antenna feed terminal 52, a second terminal coupled to transceiver circuitry 36 (FIG. 3) over transmission line path 42, and one or more terminals coupled to ground structures 79 (e.g., for forming ground antenna feed terminal 44)

Tuner 76 may include one or more tuning elements (e.g., aperture tuners), impedance matching circuitry, radio-frequency couplers, switches, signal lines, ground paths, filter circuitry, resistors, inductors (e.g., fixed or adjustable inductors), capacitors (e.g., fixed or adjustable capacitors), and/or any other desired radio-frequency circuitry for tuning, adjusting, and/or affecting the radio-frequency performance or frequency response of antenna 40-1. Tuner 76 may be mounted to an underlying substrate such as a printed circuit substrate (e.g., a flexible printed circuit for supporting the radio-frequency operation of antenna 40-1 and sometimes referred to herein as an antenna flex). Some or all of the components in tuner 76 may be mounted to the antenna flex using surface mount technology (SMT) (e.g., some or all of the components in tuner 76 may be SMT components). The components of tuner 76 may be enclosed within an electromagnetic shield, an encapsulation layer, and/or a protective overmold (e.g., an injection-molded plastic cap). Tuner 76 may receive control signals over one or more control lines on the antenna flex. The control signals may adjust one or more components of tuner 76 (e.g., may adjust the state of switching circuitry in tuner 76, may adjust the inductance of an adjustable inductor in tuner 76, may adjust the capacitance of an adjustable capacitor in tuner 76, etc.). Tuner 76 may be used to tune the frequency response of antenna 40-1 and the control signals may be used to change the frequency response of antenna 40-1 over time, for example.

Device 10 may include sensor circuitry that overlaps the area/volume of antenna 40-1. For example, device 10 may include one or more sensors 78 at, adjacent to, or overlapping the area/volume of antenna 40-1. Sensors 78 may be integrated into a sensor module 74. Sensor module 74 may be disposed at, adjacent to, or overlapping the area/volume of antenna 40-1. Sensor module 74 may include one or more dielectric substrates (e.g., flexible printed circuits, dielectric spacers, plastic overmolds, etc.) and sensor housing structures such as a conductive (e.g., metal) frame (sometimes referred to herein as a sensor chassis), cowling, and/or bracket. Sensor module 74 may sometimes also be referred to herein as sensor assembly 74, sensor package 74, or sensor structures 74. Sensor module 74 and sensors 78 may be mounted within or aligned with notch 24 in display 14 (FIG. 1), for example.

Sensors 78 may gather sensor data (e.g., sensors 78 may form part of input/output devices 28 of FIG. 1). Sensors 78 may, if desired, be optical sensors. The optical sensors may gather sensor data through the front face of device 10 (e.g., through display 14 of FIG. 4). Sensors 78 may therefore sometimes be referred to herein as front-facing sensors 78, optical sensors 78, or front-facing optical sensors 78. The optical sensors may generate sensor data based on light that passes through display 14. For example, the optical sensors may include an image sensor (e.g., a front-facing camera) that receives visible light through display 14. The image sensor may gather (generate) image sensor data (e.g., image or video data) in response to the visible light received through display 14. Additionally or alternatively, the optical sensors may include an infrared sensor. The infrared sensor may include one or more infrared emitters that emit infrared light (e.g., at infrared and/or near-infrared wavelengths) through display 14. The infrared emitters may include, for example, a dot projector (e.g., emitting a pattern of infrared dots) and a flood illuminator (e.g., illuminating a scene with a flood of infrared light). The infrared sensor may additionally or alternatively include an infrared image sensor that receives infrared light through display 14. The infrared image sensor may gather (generate) infrared image sensor data (e.g., infrared images or other data). The infrared light received by the infrared image sensor may, for example, be the infrared light emitted by the infrared emitter(s) and that has reflected off an external object (e.g., a user's face) back towards the infrared image sensor. Additionally or alternatively, the optical sensors may include an ambient light sensor that senses ambient light levels through display 14.

Tuner 76 and sensor module 74 may at least partially overlap slot 60 between segment 70 and ground structures 79. A first ground extension 80 of ground structures 79 may extend along or adjacent to antenna feed 50 and tuner 76. A second ground extension 80 of ground structures 79 may extend along or adjacent to the right edge of sensor module 74. At least some of antenna feed 50, tuner 76, and/or sensor module 74 may be interposed between the first and second ground extensions 80.

Since sensor module 74 is co-located with antenna 40-1, if care is not taken, the conductive structures in sensor module 74 can undesirably limit the wireless performance of antenna 40-1. At the same time, to maximize the wireless performance of antenna 40-1, tuner 76 and the underlying antenna flex need to be coupled to antenna ground 49 (FIG. 3) at a location as close as possible to tuner 76. This is made more difficult by the presence of sensor module 74 between tuner 76 and ground structures 79. To mitigate these issues and optimize the wireless performance of antenna 40-1 despite the presence of sensor module 74, conductive structures in sensor module 74 may be used to form one or more paths from the antenna resonating element to the antenna ground for antenna 40-1 (e.g., paths to ground structures 79 from tuner 76).

Figure 6:
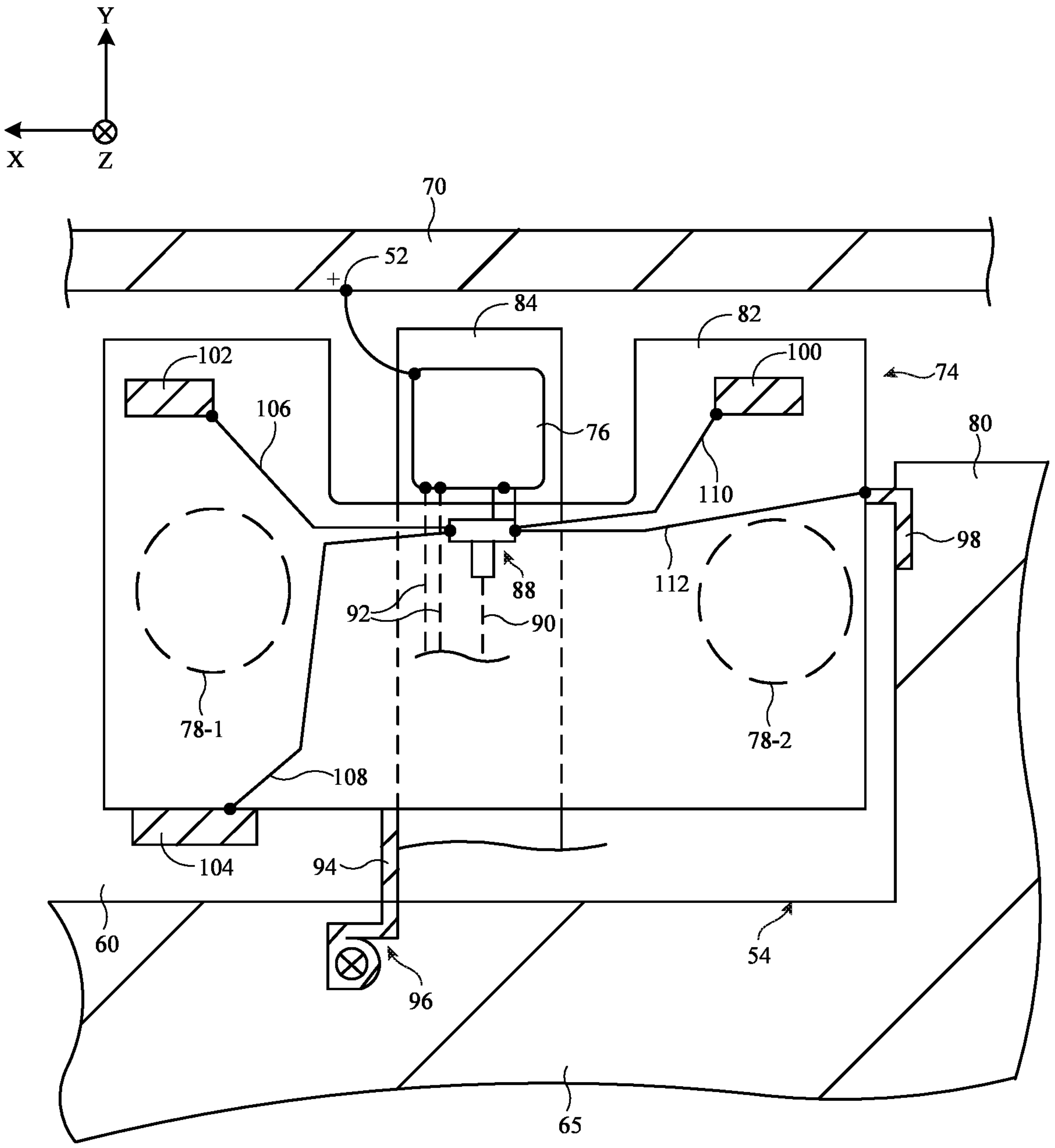
FIG. 6 is a rear interior view of an illustrative sensor module that forms grounding paths for an antenna in accordance with some embodiments.

FIG. 6 is a rear (bottom) interior view showing how sensor module 74 may be used to form one or more paths from the antenna resonating element to the antenna ground for antenna 40-1 (e.g., paths to ground structures 79 from tuner 76). Rear housing wall 12R (FIG. 4) and other internal components have been removed from the view shown in FIG. 6 for the sake of clarity.

As shown in FIG. 6, sensor module 74 may include substrates such as substrates 82. Substrates 82 may include a plastic overmold (e.g., injection molded plastic), encapsulation materials, one or more rigid or flexible printed circuits (e.g., having circuitry for supporting, controlling, reading, and/or powering sensors 78 on sensor module 74), foam members, retention members, and/or any other desired substrates for the sensors in sensor module 74. In the example of FIG. 6, sensor module 74 includes at least a first sensor 78-1 (e.g., an infrared sensor) and a second sensor 78-2 (e.g., a front-facing camera) on, embedded within, mounted to, and/or otherwise disposed on one or more of substrates 82. Sensor 78-1 may be disposed at a first (left) side of sensor module 74 whereas sensor 78-2 is disposed at an opposing second (right) side of sensor module 74.

At least some of ground structures 79 (FIG. 5) such as mid-chassis 65 may extend around at least two sides of sensor module 74. Mid-chassis 65 may include a ground extension 80 extending along the right side of sensor module 74. A printed circuit such as antenna flex 84 (e.g., a flexible printed circuit for supporting antenna 40-1) may be disposed overlapping sensor module 74. Antenna flex 84 may extend or protrude through a recess or cavity in substrates 82, for example. Tuner 76 may be mounted to antenna flex 84.

Tuner 76 may have a terminal that is coupled to positive antenna feed terminal 52 on segment 70 (e.g., using solder, welds, wire, conductive traces, conductive screws, and/or other conductive interconnect structures). Tuner 76 may have one or more terminals coupled to conductive traces 92 on antenna flex 84. Conductive traces 92 may include a signal trace (e.g., part of the signal conductor coupled to positive antenna feed terminal 52), one or more ground traces, power lines (e.g., for powering one or more components in tuner 76) and/or control lines (e.g., for providing control signals to one or more components in tuner 76). Tuner 76 may also have a terminal coupled to a conductive interconnect structure such as conductive interconnect structure 88. While conductive interconnect structure 88 may include any desired conductive interconnect structures (see, e.g., conductive interconnect structures 63 of FIG. 4), in some implementations that are described herein as an example, conductive interconnect structure 88 includes a conductive spring. Conductive interconnect structure 88 may therefore sometimes be referred to herein as conductive spring 88.

Conductive spring 88 may also be coupled to a ground trace on antenna flex 84 such as ground trace 90. Conductive spring 88 may have one or more spring fingers. The spring fingers may exert a force in the direction of sensor module 74 to help ensure a reliable electrical contact to conductive structures on sensor module 74. Antenna flex 84 may have an extended portion such as flexible printed circuit tail 94. Tail 94 may be rotated at a perpendicular angle with respect to the portion of antenna flex 84 to which tuner 76 is mounted, if desired. Tail 94 may be coupled to mid-chassis 65 using conductive interconnect structure 96 (e.g., a conductive bracket and a conductive screw). Conductive interconnect structure 96 may couple segment 70 to mid-chassis 65 and thus the antenna ground via one or more conductive paths (e.g., conductive traces) on tail 94 and antenna flex 84. Conductive interconnect structure 96 may form a short-circuit path to ground from segment 70 over the one or more conductive paths for radio-frequency signals at relatively low frequencies such as signals in an NFC band that are conveyed by antenna 40-1. Conductive interconnect structure 96 may also help to mechanically secure, mount, or attach sensor module 74 to mid-chassis 65.

Sensor module 74 may include conductive structures. The conductive structures may include conductive brackets (e.g., for sensors 78-1 and 78-2), a conductive chassis, frame, or housing for sensor module 74, conductive members on one or more of substrates 82 (e.g., conductive traces on one or more printed circuits in substrates 82), conductive foam, sheet metal members, conductive interconnect structures, conductive springs, conductive wires, welds, solder, conductive tabs, conductive pins, and/or any other desired conductive members. The conductive structures may be used to form one or more ground paths from tuner 76 to ground structures 79 (FIG. 5). Each of the ground paths may be coupled to conductive spring 88 on antenna flex 84. Conductive spring 88 may, for example, press against a contact pad or another conductive structure in sensor module 74 that is coupled to or that forms part of each of the ground paths (e.g., a conductive chassis).

As shown in FIG. 6, sensor module 74 may include at least ground paths 106, 108, 110, and 112 coupled to conductive spring 88. Conductive spring 88 may electrically couple tuner 76 to each of ground paths 106-112. Conductive spring 88 may also exert a biasing (spring) force against ground paths 106-112 (e.g., in the −Z direction) that helps to ensure a robust mechanical and electrical connection between tuner 76 and the ground paths over time. Each ground path may be coupled to a portion of ground structures 79 (FIG. 5) over a respective conductive interconnect structure on sensor module 74. For example, sensor module 74 may include conductive interconnect structure 102, conductive interconnect structure 100, conductive interconnect structure 98, and conductive interconnect structure 104. Ground path 106 may couple conductive spring 88 to conductive interconnect structure 102. Ground path 110 may couple conductive spring 88 to conductive interconnect structure 100. Ground path 108 may couple conductive spring 88 to conductive interconnect structure 104. Ground path 112 may couple conductive spring 88 to conductive interconnect structure 98. Ground paths 106-112 may each be formed from respective conductive structures on sensor module 74 or, if desired, two or more of ground paths 106-112 may be formed at least in part from the same conductive structure on sensor module 74 (e.g., from a conductive chassis for sensor module 74). If desired, portions of ground paths 106-112 may be shared between two or more of the ground paths.

Conductive interconnect structures 98-104 may be disposed at different respective locations on sensor module 74. For example, conductive interconnect structures 102 and 104 may be disposed at or adjacent to the first (left) end (side) of sensor module 74 whereas conductive interconnect structures 100 and 98 are disposed at or adjacent to the second (right) end (side) of sensor module 74. If desired, sensor 78-1 may be laterally interposed between conductive interconnect structures 102 and 104.

Conductive interconnect structures 98-104 may each include any desired conductive interconnect structures and may, if desired, each form all or part of respective conductive interconnect structures 63 of FIG. 4. As such, conductive interconnect structures 98-104 may each include conductive traces, conductive pins, conductive springs, conductive prongs, conductive brackets, conductive screws, conductive clips, conductive tape, conductive wires, conductive traces, conductive foam, conductive adhesive, solder, welds, metal members (e.g., sheet metal members), contact pads, conductive vias, conductive portions of one or more components mounted to mid-chassis 65 and/or conductive support plate 58, and/or any other desired conductive interconnect structures. In some implementations that are described herein as an example, conductive interconnect structure 104 includes conductive foam and conductive interconnect structures 100, 102, and 98 each include conductive springs.

Conductive interconnect structures 98-104 may couple (e.g., ground or short) their respective ground paths 106-112 to ground structures 79 (FIG. 5) and thus antenna ground 49 (FIG. 3) for antenna 40-1. Conductive interconnect structures 98-104 may each couple their respective ground paths 106-112 to mid-chassis 65, display module 62, and/or conductive support plate 58 (FIG. 4). In some implementations that are described herein as an example, conductive interconnect structure 98 may couple ground path 112 to mid-chassis 65, conductive interconnect structure 104 may couple ground path 108 to display module 62 (FIG. 4), conductive interconnect structure 102 may couple ground path 106 to conductive support plate 58, and conductive interconnect structure 100 may couple ground path 110 to conductive support plate 58.

In this way, the conductive structures on sensor module 74 may couple antenna 40-1 (e.g., tuner 76) to ground structures 79 (FIG. 5) at multiple (e.g., four) locations across multiple physical planes (e.g., in three different planes across the conductive support plate, the display module, and mid-chassis 65). In other words, antenna 40-1 and tuner 76 may be grounded to ground structures 79 (FIG. 5) through sensor module 74 (e.g., sensor module 74 may form paths to ground for antenna 40-1 and tuner 76). This may serve to couple antenna 40-1 to ground as close as possible to tuner 76 despite the presence of sensor module 74, thereby maximizing the wireless performance (e.g., antenna efficiency) of antenna 40-1. Overlapping sensor module 74 with antenna flex 84 and the volume of antenna 40-1 may help to minimize the volume of device 10 (e.g., while allowing space for other components in device 10).

The example of FIG. 6 is merely illustrative. In general, sensor module 74 may include fewer than four or more than four ground paths from conductive spring 88 to the antenna ground over respective conductive interconnect structures. Conductive interconnect structures may be disposed at any desired location on sensor module 74. Sensor module 74 may have other shapes and may carry any desired number of sensors 78. Mid-chassis 65 may have other shapes in practice.

Figure 7:
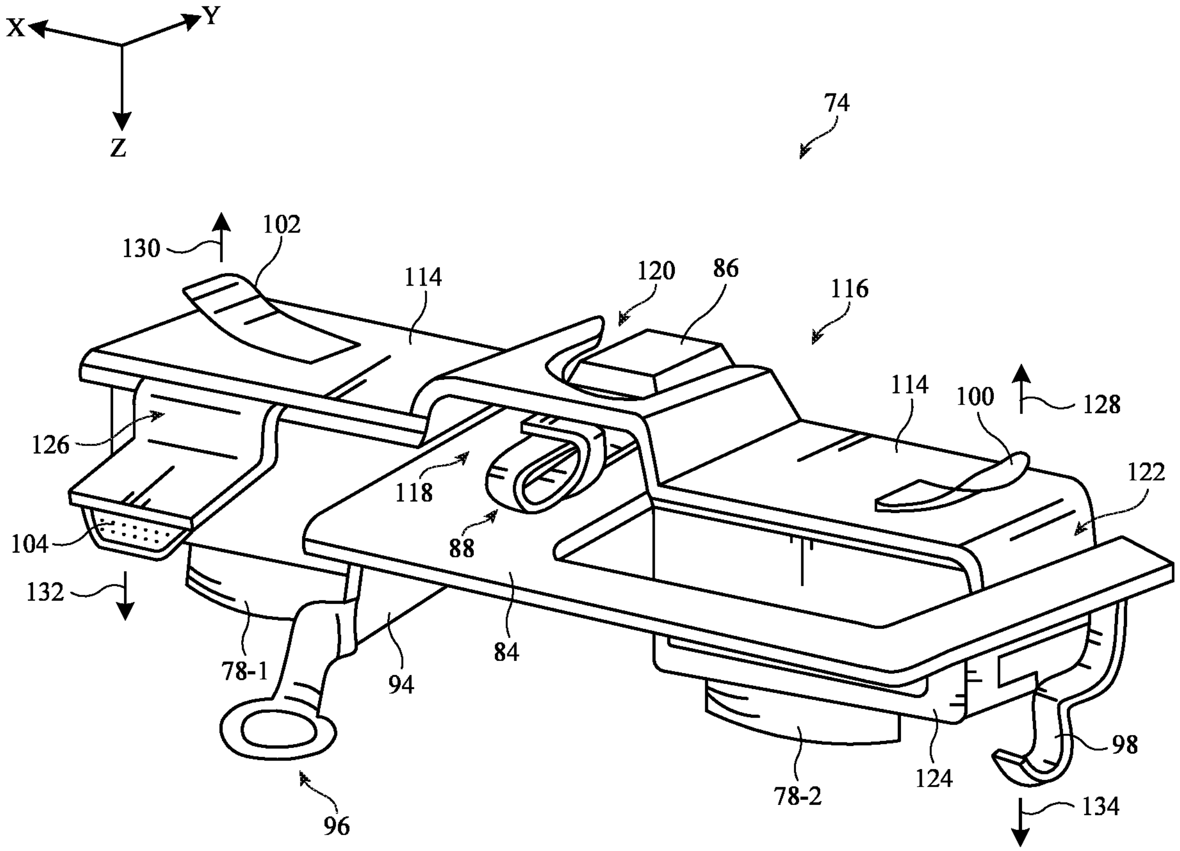
FIG. 7 is a rear perspective view of an illustrative sensor module that forms grounding paths for an antenna in accordance with some embodiments.

FIG. 7 is a rear perspective view of sensor module 74. In the example of FIG. 7, some of the substrates 82 in sensor module 74 (e.g., an injection-molded plastic overmold) have been omitted for the sake of clarity. As shown in FIG. 7, sensor module 74 may include a conductive sensor chassis such as conductive chassis 114. Conductive chassis 114 may sometimes be referred to herein as conductive housing 114 or conductive frame 114 (e.g., a conductive sensor frame). Conductive chassis 114 may be formed from bent (folded) sheet metal or other conductive materials. Conductive chassis 114 may extend across the length of sensor module 74 (e.g. parallel to the X-axis) and the width of sensor module 74 (e.g., parallel to the Y-axis). Sensors 78-1 and 78-2 and one or more of substrates 82 (FIG. 6) may be disposed on, mounted, or otherwise supported by conductive chassis 114.

Conductive chassis 114 may have a raised portion 116 that defines a recess or cavity 118. Antenna flex 84 may extend through cavity 118 of conductive chassis 114. Conductive spring 88 may be mounted to the surface of antenna flex 84 (e.g., to ground trace 90 of FIG. 6 using solder). Tail 94 of antenna flex 84 may terminate in conductive interconnect structure 96. Tuner 76 may be mounted to the surface of antenna flex 84. Tuner 76 may, if desired, be enclosed within an injection-molded plastic cap or other encapsulation layer. If desired, raised portion 116 of conductive chassis 114 may have an opening such as notch (slot) 120 that accommodates the vertical height of tuner 76. Tuner 76 may, for example, be disposed within notch 120 of conductive chassis 114.

Sensor module 74 may also include a conductive structure such as conductive structure 126 (e.g., a bent piece of sheet metal). Conductive structure 126 may be formed from an integral portion of conductive chassis 114 or from a separate piece of metal that is layered onto or otherwise coupled to conductive chassis 114. Conductive structure 126 may extend away from conductive chassis 114 (e.g., in the −Y and/or +Z directions). Conductive interconnect structure 104 may be mounted to or otherwise formed from conductive structure 126 (e.g., may be formed from conductive foam integrated into conductive structure 126).

Sensor module 74 may further include a conductive structure such as conductive structure 124 (e.g., a metal bracket supporting sensor 78-2). Conductive structure 124 may be formed from an integral portion of conductive chassis 114 or from a separate piece of metal that is layered onto or otherwise coupled to conductive chassis 114. Conductive interconnect structure 98 may be mounted to or otherwise formed from conductive structure 124 (e.g., may be formed from a bent portion of conductive structure 124 that forms a conductive spring extending in the +Z direction away from conductive chassis 114).

Conductive interconnect structure 102 may be disposed on conductive chassis 114 (e.g., to a portion of conductive chassis 114 overlapping sensor 78-1). Conductive interconnect structure 100 may also be disposed on conductive chassis 114 (e.g., to a portion of conductive chassis 114 overlapping sensor 78-2). Raised portion 116 of conductive chassis 114 may be laterally interposed between conductive interconnect structures 102 and 100. Conductive interconnect structures 102 and 100 may be mounted, layered onto, welded, soldered, or otherwise attached to conductive chassis 114. In other implementations, conductive interconnect structures 102 and 100 may be formed from integral portions of conductive chassis 114. Conductive interconnect structures 102 and 100 may be, for example, conductive springs.

Conductive spring 88 may have one or more spring fingers that exert a biasing force against conductive chassis 114 (e.g., in the −Z direction). This may serve to electrically couple tuner 76 to conductive chassis 114. Conductive chassis 114 may form part of one or more (e.g., each) of ground paths 106-112 of FIG. 6. For example, ground path 106 of FIG. 6 may include the portion of conductive chassis 114 extending from conductive spring 88 to conductive interconnect structure 102. Ground path 108 of FIG. 6 may include conductive structure 126 and the portion of conductive chassis 114 extending from conductive spring 88 to conductive structure 126. Ground path 110 of FIG. 6 may include the portion of conductive chassis 114 extending from conductive spring 88 to conductive interconnect structure 100. Ground path 112 of FIG. 6 may include a portion of conductive structure 124 and may include the portion of conductive chassis 114 extending from conductive spring 88 to conductive structure 124.

When mounted within device 10, conductive interconnect structures 98-104 may exert biasing forces in different directions against different portions of ground structures 79 (FIG. 5), which helps to ensure an electrically and mechanically robust connection to ground for tuner 76. For example, conductive interconnect structure 104 may be electrically and/or mechanically coupled to display module 62 (FIG. 4) and may exert a biasing force in the direction of arrow 132 (e.g., the +Z direction). Conductive interconnect structure 102 may be electrically and/or mechanically coupled to conductive support plate 58 and may exert a biasing force in the direction of arrow 130 (e.g., the −Z direction). Conductive interconnect structure 100 may be electrically and/or mechanically coupled to conductive support plate 58 and may exert a biasing force in the direction of arrow 128 (e.g., the −Z direction). Conductive interconnect structure 98 may be electrically and/or mechanically coupled to mid-chassis 65 and may exert a biasing force in the direction of arrow 134 (e.g., the +Z direction).

Collectively, the conductive structures in sensor module 74 that form ground paths 106-112 (FIG. 6) and conductive interconnect structures 98-104 may help to ensure that there is a mechanically and electrically robust connection from antenna 40-1 to ground at a location as close to tuner 76 as possible, distributed across all three planes of conductive material used to form the antenna ground for antenna 40-1 (e.g., display module 62, conductive support plate 58, and mid-chassis 65 of FIG. 4). The example of FIG. 7 is merely illustrative and, in general, sensor module 74 may have other configurations, shapes, or arrangements. If desired, tuner 76 may be coupled to any desired location on segment 70 (e.g., tuner 76 need not be coupled to positive antenna feed terminal 52).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
peripheral conductive housing structures;
an antenna having an antenna resonating element formed from a segment of the peripheral conductive housing structures;
ground structures separated from the segment by a slot;
a conductive chassis at least partially overlapping the slot; and
a sensor mounted to the conductive chassis, wherein the conductive chassis forms at least part of a ground path from the segment to the ground structures, wherein
the ground path is coupled to a first location on the ground structures, and
the conductive chassis forms at least part of a first additional ground path from the segment to a second location on the ground structures that is different from the first location.

2. The electronic device of claim 1, wherein the ground structures comprise:
a first conductive layer, the first location being on the first conductive layer; and
a second conductive layer at least partially overlapping the first conductive layer, the second location being on the second conductive layer.

3. The electronic device of claim 2, wherein the conductive chassis forms at least part of a second additional ground path from the segment to a third location on the conductive chassis, the conductive chassis forms at least part of a third additional ground path from the segment to a fourth location on the ground structures, the third location is different from the first and second locations, and the fourth location is different from the first, second, and third locations.

4. The electronic device of claim 3, wherein the ground structures comprise:
a third conductive layer at least partially overlapping the first and second conductive layers, wherein the third location and the fourth location are on the third conductive layer.

5. The electronic device of claim 4, further comprising:
a housing wall; and
a display, wherein the peripheral conductive housing structures extend from the display to the housing wall, the housing wall comprises the third conductive layer, the display comprises the first conductive layer, and the second conductive layer is interposed between the display and the housing wall.

6. The electronic device of claim 5, further comprising:
a first spring that couples the second additional ground path to the third location on the third conductive layer;
a second spring that couples the third additional ground path to the fourth location on the third conductive layer; and
a third spring that couples the first additional ground path to the second conductive layer.

7. The electronic device of claim 5, wherein the sensor comprises an optical sensor configured to receive light through the display.

8. The electronic device of claim 1, further comprising:
a flexible printed circuit;
a conductive spring on the flexible printed circuit and contacting the conductive chassis; and
a tuner on the flexible printed circuit, the tuner having a first terminal coupled to the segment and a second terminal coupled to the conductive spring.

9. The electronic device of claim 8, wherein the flexible printed circuit has a tail, the electronic device further comprising:
a conductive interconnect structure that couples the tail to the ground structures, the conductive interconnect structure being configured to convey near-field communications (NFC) signals from the segment to the ground structures.

10. An electronic device comprising:
an antenna arm;
ground structures;
a tuner coupled to the antenna arm; and
a sensor module, wherein the tuner is coupled to the ground structures through the sensor module.

11. The electronic device of claim 10, further comprising:
a printed circuit, the tuner being mounted to the printed circuit; and
a conductive spring on the printed circuit, wherein the conductive spring couples the tuner to a conductive structure in the sensor module.

12. The electronic device of claim 11, wherein the sensor module comprises:
a conductive frame; and
an optical sensor mounted to the conductive frame, wherein the conductive structure comprises a portion of the conductive frame.

13. The electronic device of claim 10, wherein the ground structures comprise:
a first conductive layer; and
a second conductive layer that is separated from the first conductive layer, the sensor module comprising
a first ground path that couples the tuner to the first conductive layer, and
a second ground path that couples the tuner to the second conductive layer.

14. The electronic device of claim 13, wherein the ground structures further comprise:
a third conductive layer, the second conductive layer being interposed between the first and third conductive layers, and the sensor module further comprising
a third ground path that couples the tuner to the third conductive layer.

15. The electronic device of claim 14, further comprising:
a first conductive spring that couples the first ground path to the first conductive layer;
a second conductive spring that couples the second ground path to the second conductive layer; and
conductive foam that couples the third ground path to the third conductive layer.

16. The electronic device of claim 14, further comprising:

a housing having peripheral conductive housing structures and a rear housing wall; and a display mounted to the peripheral conductive housing structures opposite the rear housing wall, wherein the rear housing wall comprises the first conductive layer and the display comprises the third conductive layer.

17. Apparatus comprising:

ground structures;

a conductive chassis;

an optical sensor mounted to the conductive chassis;

a printed circuit overlapping the conductive chassis;

radio-frequency circuitry on the printed circuit;

a first conductive interconnect structure that couples the radio-frequency circuitry to the conductive chassis; and a second conductive interconnect structure that couples the conductive chassis to the ground structures.

18. The apparatus of claim 17, wherein the ground structures comprise a first conductive layer and a second conductive layer, the apparatus further comprising:

a third conductive interconnect structure that couples the conductive chassis to the ground structures, wherein the first conductive interconnect structure is configured to exert a first biasing force against the conductive chassis in a first direction, the second conductive interconnect structure is configured to exert a second biasing force against the first conductive layer in the first direction, and the third conductive interconnect structure is configured to exert a third biasing force against the second conductive layer in a second direction opposite the first direction.

19. The apparatus of claim 18, wherein the conductive chassis has a raised portion that defines a cavity, the printed circuit extends through the cavity, and the apparatus further comprises:

an additional optical sensor mounted to the conductive chassis, the printed circuit being interposed between the optical sensor and the additional optical sensor; and a fourth conductive interconnect structure that couples the conductive chassis to the ground structures, the fourth conductive interconnect structure being configured to exert a fourth biasing force against the second conductive layer in the second direction and the raised portion of the conductive chassis being interposed between the third and fourth conductive interconnect structures.

20. The apparatus of claim 17, wherein the ground structures comprise a first conductive layer and a second conductive layer, the apparatus further comprising:

a third conductive interconnect structure that couples the conductive chassis to the ground structures.

* * * * *